(12) United States Patent
Vitoorapakorn et al.

(10) Patent No.: US 7,025,524 B2
(45) Date of Patent: Apr. 11, 2006

(54) BED LINER RETAINER APPARATUS FOR A VEHICLE

(75) Inventors: Ekawat Vitoorapakorn, Changwad Rayong (TH); Supawadee Vitoorapakorn, Changwad Samutprakarn (TH)

(73) Assignee: Aeroflex International Co., Ltd., Changwad Rayong (TH)

( * ) Notice: Subject to any disclaimer, the term of this patent is extended or adjusted under 35 U.S.C. 154(b) by 0 days.

(21) Appl. No.: 10/400,355

(22) Filed: Mar. 27, 2003

(65) Prior Publication Data
US 2004/0041427 A1 Mar. 4, 2004

Related U.S. Application Data

(63) Continuation-in-part of application No. 10/233,758, filed on Sep. 3, 2002.

(51) Int. Cl.
*F16B 2/00* (2006.01)

(52) U.S. Cl. .................. 403/408.1; 403/373; 410/106; 410/107; 296/39.2

(58) Field of Classification Search ........... 410/106, 410/107, 109–112; 403/373, 408.1; 296/39.2; 248/510, 505; 24/265 CD, 265 AL, 458; 411/166, 396, 400; 224/403, 404, 558, 547
See application file for complete search history.

(56) References Cited

U.S. PATENT DOCUMENTS

| | | | |
|---|---|---|---|
| 4,572,568 A | 2/1986 | Kapp et al. | |
| 4,595,229 A | 6/1986 | Wagner | |
| 4,659,133 A | 4/1987 | Gower | |
| 4,740,026 A | 4/1988 | Wagner | |
| 4,750,776 A | 6/1988 | Barben | |
| 4,796,942 A | 1/1989 | Robinson et al. | |
| 4,850,633 A | 7/1989 | Emery | |
| 4,906,040 A | 3/1990 | Edwards | |
| 5,046,775 A | 9/1991 | Marcum, Jr. et al. | |
| 5,100,193 A | 3/1992 | Oprea et al. | |
| 5,134,964 A * | 8/1992 | Masters ............... | 114/347 |
| 5,180,263 A | 1/1993 | Flowers, Jr. | |
| 5,267,820 A | 12/1993 | Sturtevant | |
| 5,360,250 A | 11/1994 | Wood et al. | |
| 5,364,150 A | 11/1994 | Cochran et al. | |
| 5,372,397 A | 12/1994 | Arndt | |
| 5,738,471 A | 4/1998 | Zentner et al. | |
| RE36,073 E | 2/1999 | Kremer et al. | |
| 6,039,520 A | 3/2000 | Cheng | |
| 6,196,777 B1 * | 3/2001 | Price ................ | 410/102 |
| 6,203,090 B1 | 3/2001 | Vitoorapakorn | |
| 6,565,300 B1 | 5/2003 | Herring | |

FOREIGN PATENT DOCUMENTS

| | | |
|---|---|---|
| AU | 618930 | 1/1992 |
| TH | 10615 | 10/1999 |

* cited by examiner

*Primary Examiner*—Daniel P. Stodola
*Assistant Examiner*—Michael P. Ferguson
(74) *Attorney, Agent, or Firm*—Akin Gump Strauss Hauer & Feld, LLP

(57) ABSTRACT

A fastener assembly for securing a bed liner having a plurality of liner holes to a pickup truck cargo bed having a bed rail includes a retaining plate that engages a lip that depends from a downward-depending portion of the bed rail. The fastener assembly further includes a base member that engages the retaining plate through its associated bed liner hole such that the base member and the retaining plate engage the bed liner and cargo bed in a clamping arrangement, securing the bed liner to the cargo bed. Finally, the fastener assembly includes a foldable tie-down member that may be used to secure cargo within the cargo bed after the bed liner is installed.

15 Claims, 9 Drawing Sheets

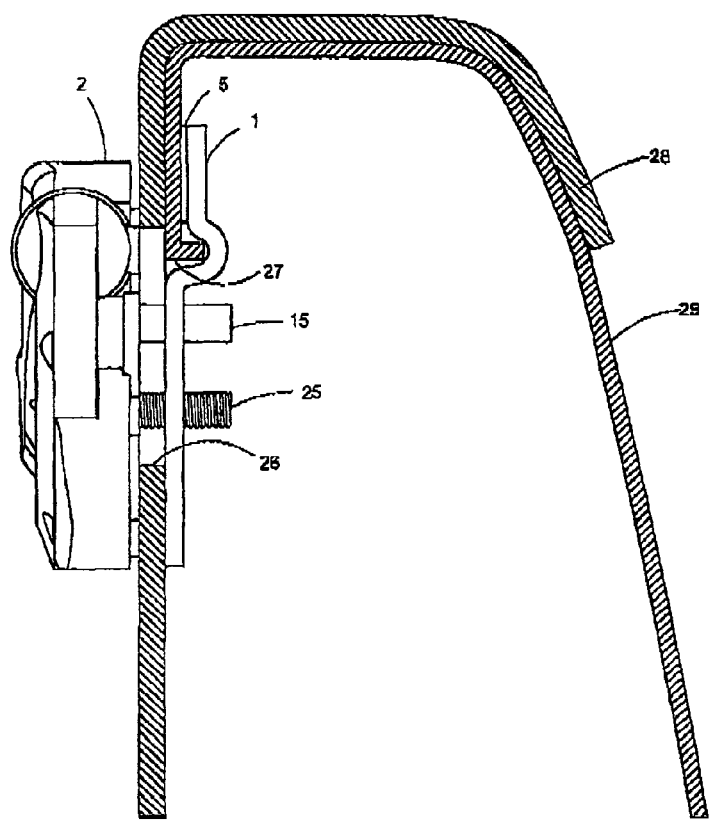
FIG. 3
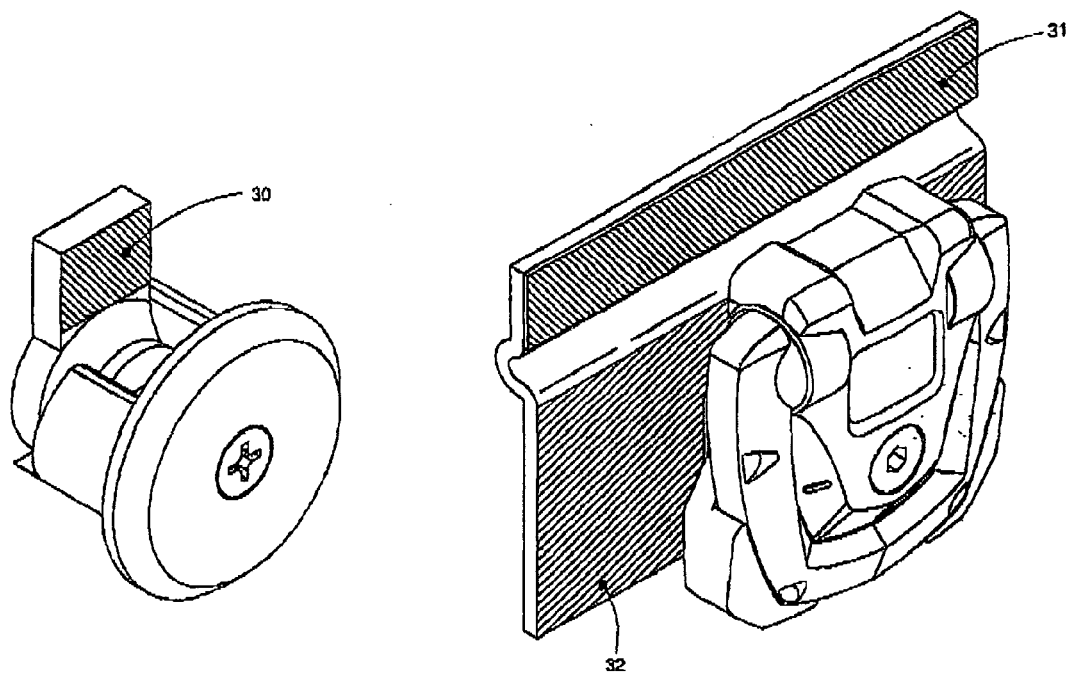
FIG. 4.1 (Prior Art)
FIG. 4.2

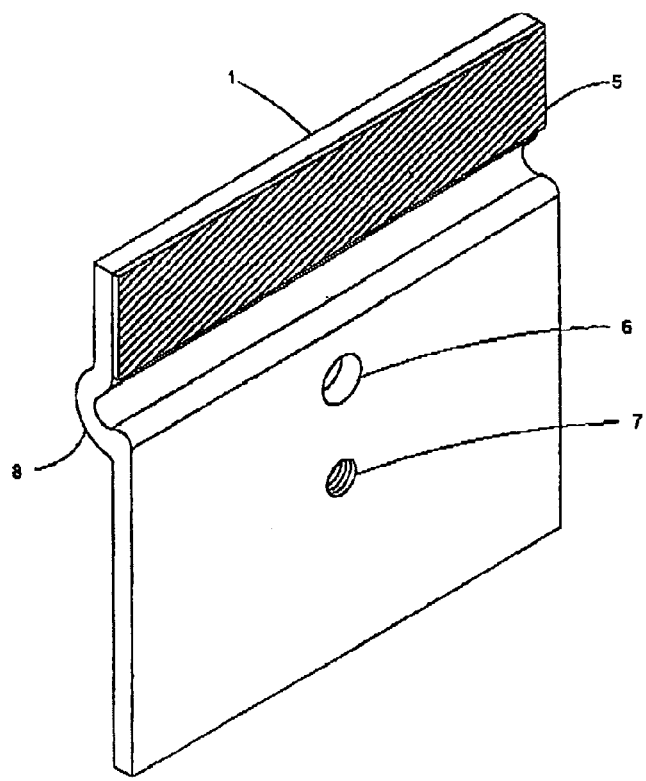
FIG. 5.1
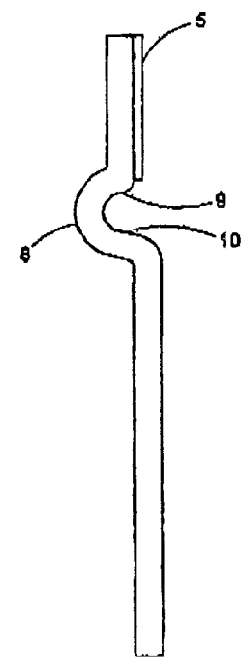
FIG. 5.2
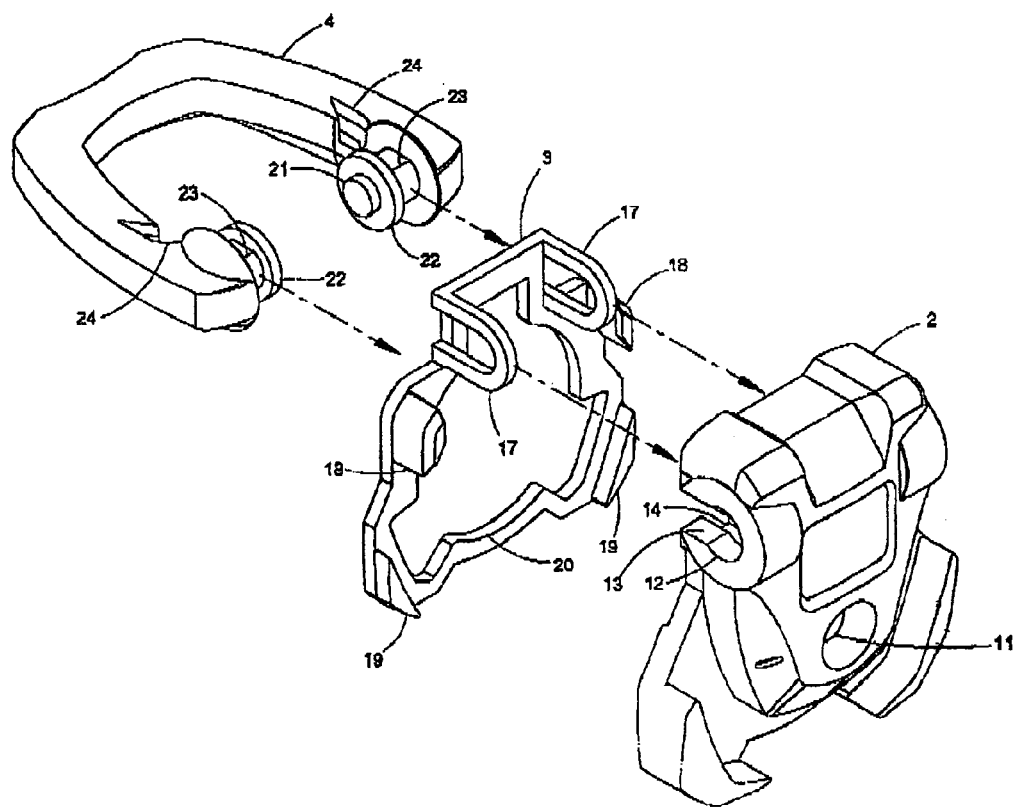
FIG. 6

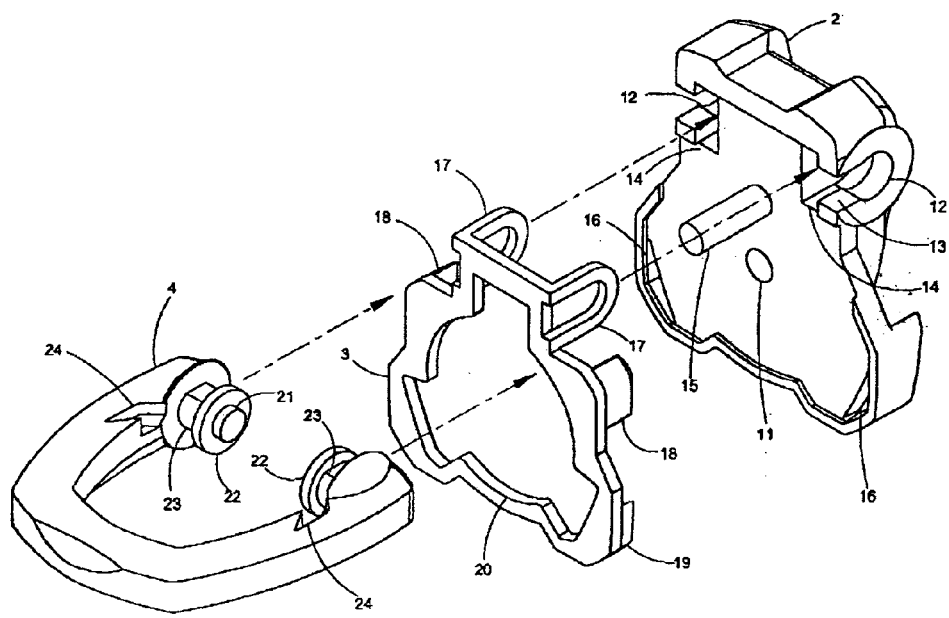
FIG. 7
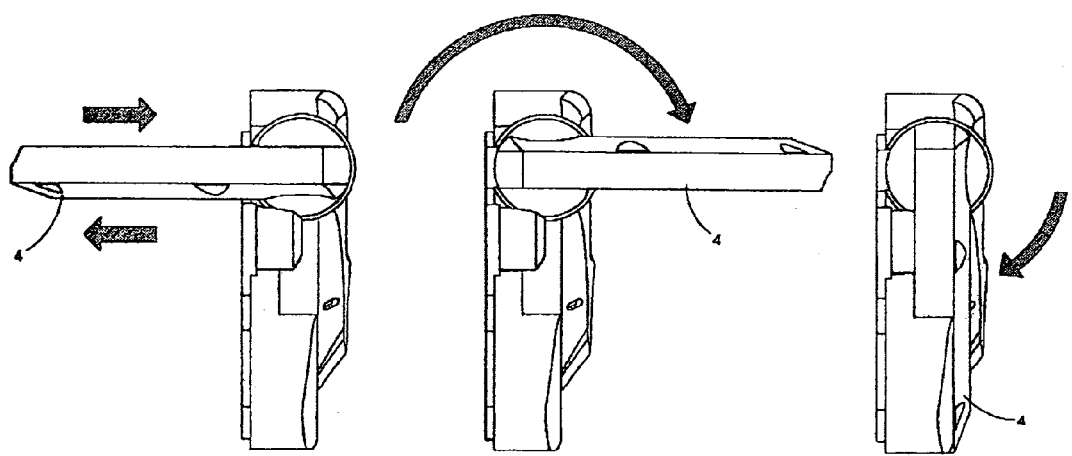
FIG. 8.1  FIG. 8.2  FIG. 8.3
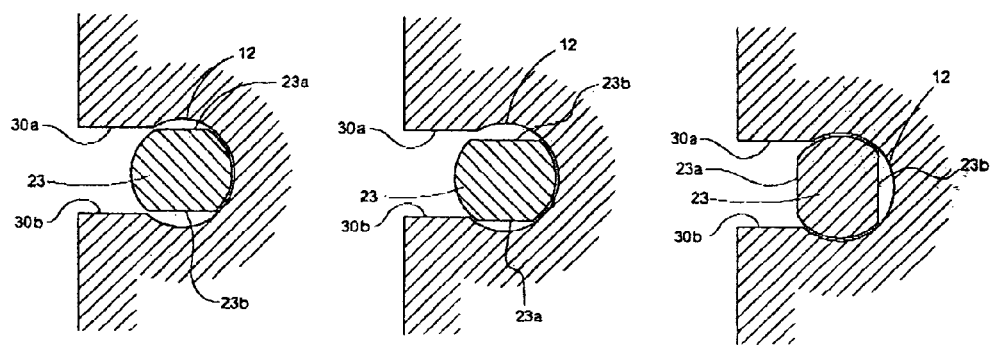
FIG. 8.1A  FIG. 8.2A  FIG. 8.3A

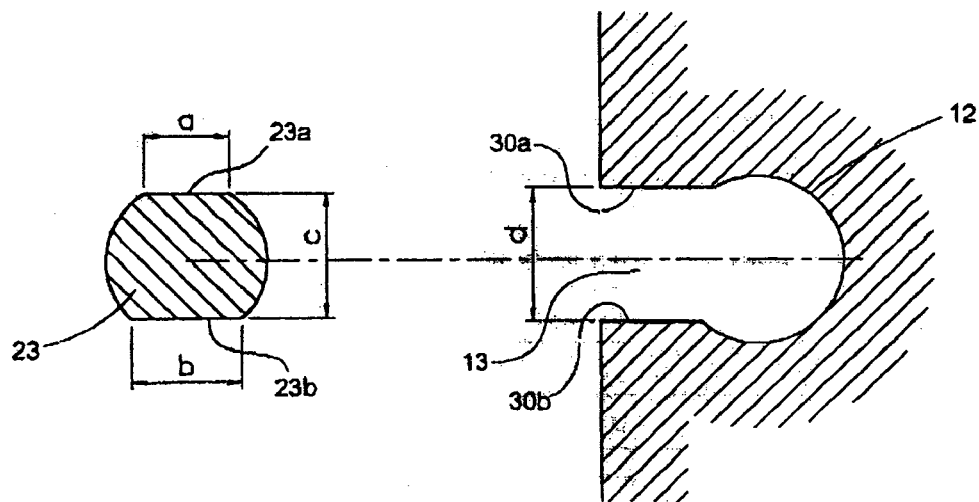
FIG. 9
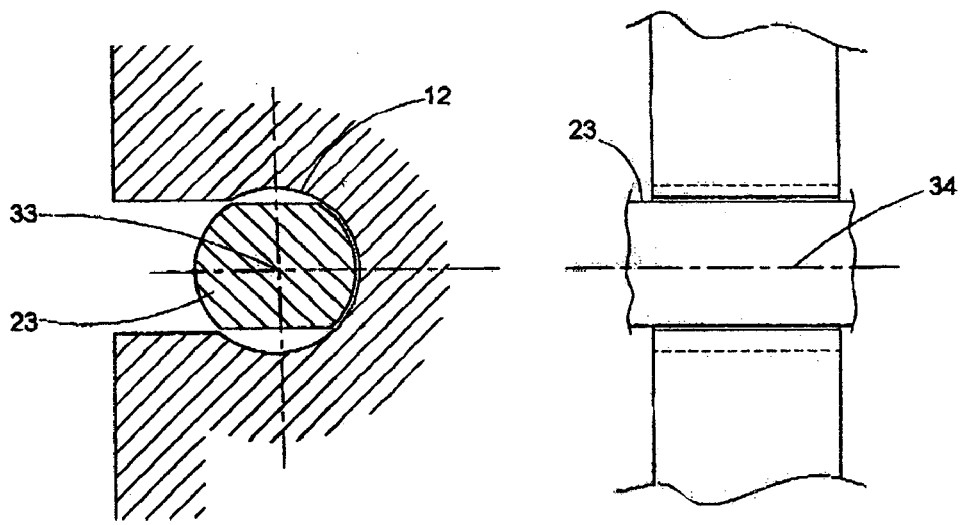
FIG. 10.1  FIG. 10.2

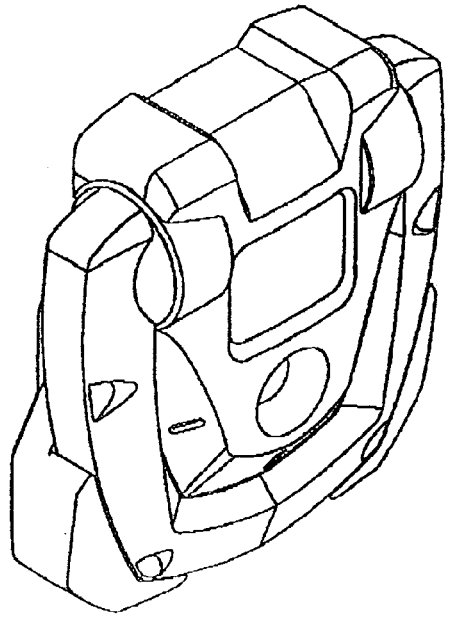
FIG. 11.1
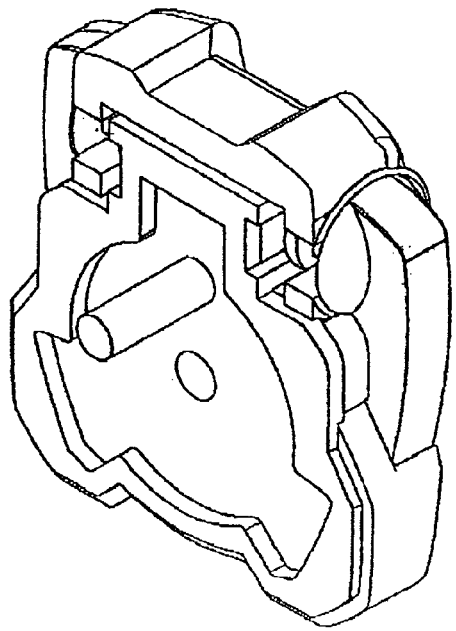
FIG. 11.2
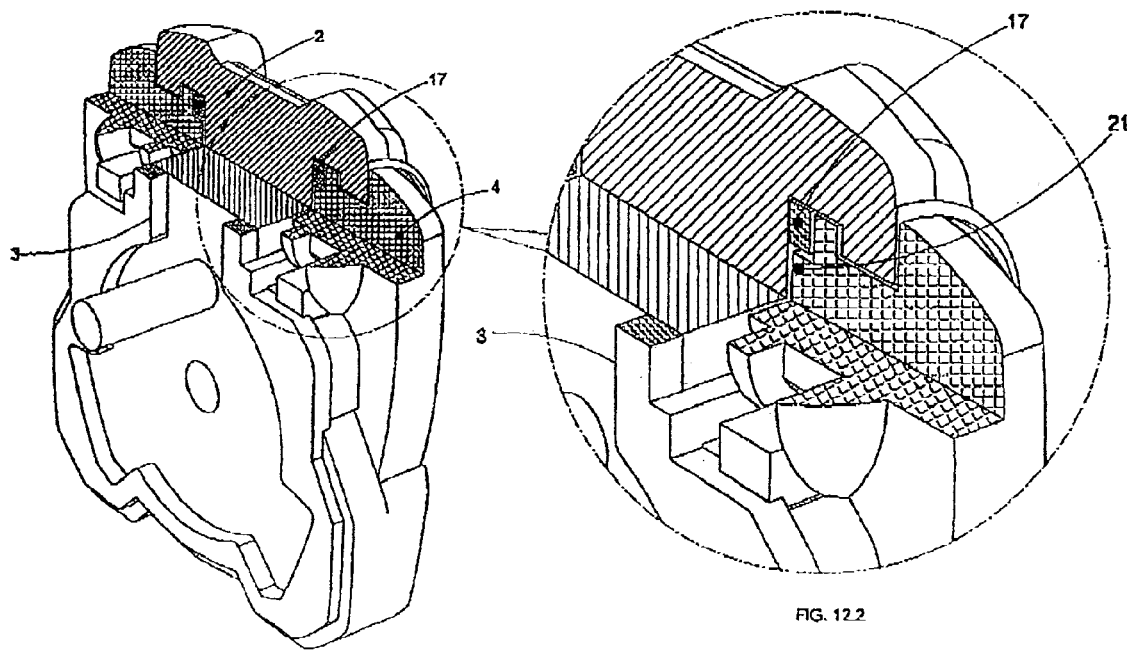
FIG. 12.1
FIG. 12.2

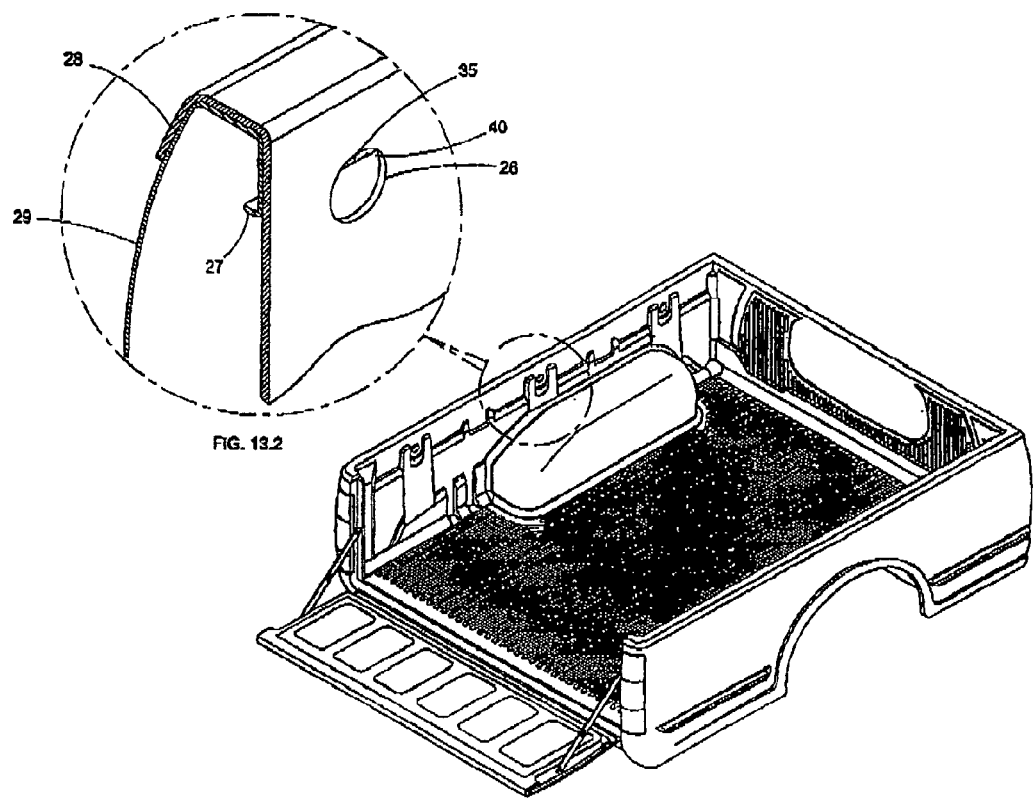
FIG. 13.2
FIG. 13.1
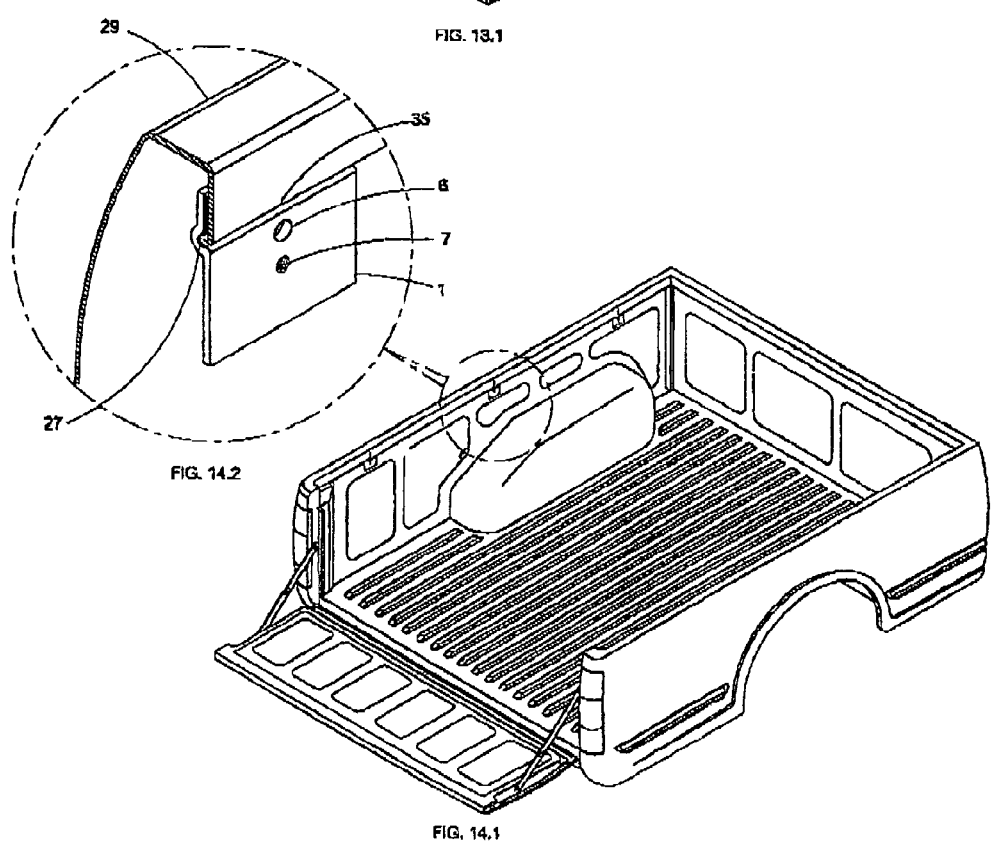
FIG. 14.2
FIG. 14.1

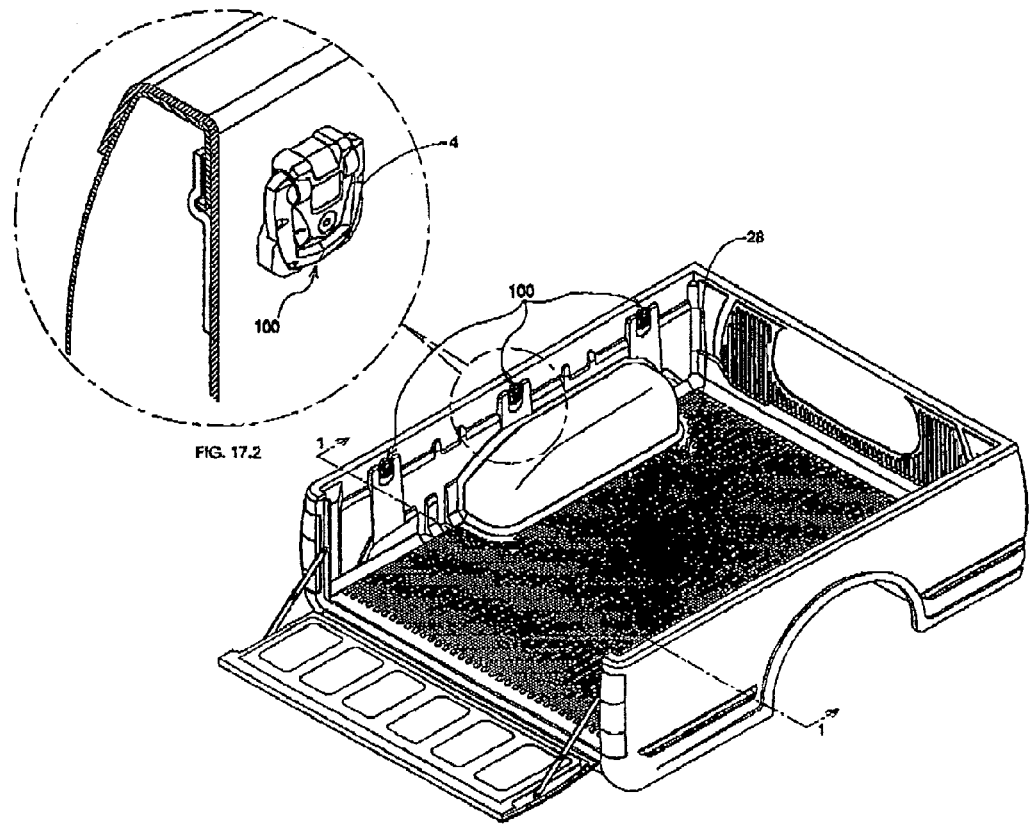
FIG. 17.2
FIG. 17.1
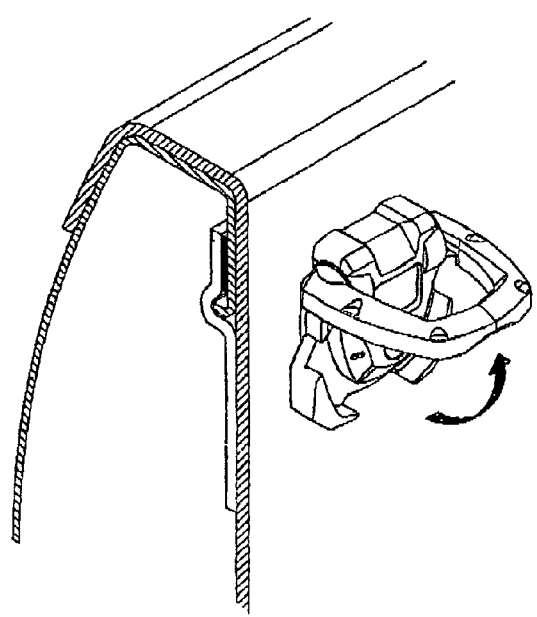
FIG. 18

BED LINER RETAINER APPARATUS FOR A VEHICLE

CROSS-REFERENCE TO RELATED APPLICATIONS

The present application is a continuation-in-part of U.S. patent application Ser. No. 10/233,758, filed Sep. 3, 2002.

BACKGROUND OF THE INVENTION

The present application relates to an apparatus that retains a bed liner in the cargo bed of a vehicle such as a pickup truck.

Various patents have been granted in the field of truck bed liners. For example, U.S. Pat. No. 5,267,820 ("the '820 patent") (the disclosure of which is hereby incorporated herein by reference) discloses a fastener assembly for holding a bed liner in a pickup truck bed. A perspective view of the fastener disclosed in the '820 patent is shown on FIG. 4.1. The fastener assembly includes a faceplate and a trough-shaped wall that supports a linearly movable clamp member. The clamp member can be rotated within the trough to swing a clamp arm upwardly to a generally vertical position where it is aligned with the downwardly extending lip on the top of a truck bed side wall. A screw extends through the trough into a threaded hole in the clamp member. The screw can be rotated to rotate the clamp arm and move it linearly along the trough such that surface 30 is engaged in a clamping arrangement with the inside of the rail lip. The fastener assembly is a self-contained unitary structure that can be installed through a circular opening in the bed liner side wall after the liner is placed in position within the truck bed.

Pickup trucks normally have cargo-securing tie-down devices that are supplied as original equipment. The device disclosed in the '820 patent, however, does not include a tie-down device for securing cargo. Moreover, after the fastener assembly and bed liner is installed according to the '820 patent, the bed liner covers the original-equipment tie-down devices. Thus, to use one or more of the supplied tie-down devices, holes must be cut in the bed liner, which holes necessarily should be larger than the tie-down device. Water, sand, rocks or other debris may accumulate in the holes and damage the pickup truck bed. For example, holes may allow water into the space between the bed liner and the bed, corroding the bed.

U.S. Pat. No. 6,203,090 ("the '090 patent") (the disclosure of which is hereby incorporated herein by reference) provides a tie-down member but presents other problems. The '090 patent discloses a retainer apparatus for securing a bed liner to a pickup truck bed having a plurality of factory-installed tie-down members. The tie-down members are removed, exposing factory-drilled holes containing threaded members. The retainer apparatus of the '090 patent includes retaining plates that have holes corresponding to the factory-drilled holes in the bed. First, the retaining plates are installed into the bed holes. The bed liner is then placed into the pickup truck bed. The bed liner has holes that correspond to additional holes in the retaining plates, and the bed liner is secured through its holes onto the additional retaining plate holes. Tie-down members are attached to the bed liner in alignment with corresponding holes in the front and rear retaining plates. The tie-down members include a base member with a plurality of holes that align with corresponding holes on the bed liner, and a fold-down ring that is pivotally attached to the base member and that has a tie-down hole through it. The major disadvantage to this design is that it is only usable with certain truck bed designs. If the pickup truck bed does not have holes at locations roughly corresponding to the holes in the bed liner, the retaining plates cannot be used to fasten the bed liner to the pickup bed. Otherwise, to use the apparatus of the '090 patent to secure a bed liner to a pickup truck bed, new holes are drilled in the truck bed, which is not preferred because drilling of new holes is an invasive installation process that may damage the truck bed. The possible applications of the apparatus of the '090 patent are therefore limited.

Thus, there is a need for a retainer apparatus or fastener assembly for securing a bed liner to a wide variety of pickup truck beds without requiring either factory-drilled or consumer-drilled holes in the truck beds. Moreover, there is a need for a fastener assembly that provides a tie-down device for securing cargo within the truck bed.

BRIEF SUMMARY OF THE INVENTION

Accordingly, the present invention provides a fastener assembly that secures a bed liner to a cargo bed, such as those found in pickup trucks, without the need to drill holes in or otherwise alter the bed itself. The present invention also includes a device that may be used to secure cargo within the cargo bed after the bed liner is installed. The present invention comprises three main parts: a retaining plate, a base member, and a tie-down member. The retaining plate has a trough that engages a lip that extends from the terminal end of the inner wall of the cargo bed (or bed rail). The foldable tie-down member engages the base member and the base member engages the retaining plate. A screw is inserted into a hole on the base member and engages a threaded hole in the retaining plate. This clamps the bed liner and cargo bed between the retaining plate and the base member to secure the bed liner to the cargo bed. The tie-down member need not be any particular shape; it need only be suitable for securing rope or other devices that can be used to tie-down cargo in the bed. When in use, the tie-down member is rotated up to be 90 degrees to the base member so that the user can use the tie-down member to secure cargo to or within the cargo bed. When not in use, the tie-down member is folded down to lie flat against the base member.

It is anticipated that the present invention will be used mainly to secure a plastic bed liner to the cargo bed of a pickup truck. The present invention may be used, however, to secure a liner to the cargo area on any type of vehicle, or to a cargo area that is not part a vehicle.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is an additional sectional view of the truck bed and bed liner similar to FIG. 2 with the fastener assembly shown in side elevation;

FIG. 4.1 is a perspective view of a prior art fastener assembly;

FIG. 4.2 is a perspective view of the fastener assembly of FIG. 1 mounted to a retaining plate in accordance with the present invention;

FIG. 5.1 is a perspective view of the retaining plate of FIG. 4.2;

FIG. 5.2 is a side elevational view of the retaining plate of FIG. 4.2;

FIG. 6 is a front exploded perspective view of the fastener assembly of FIG. 1;

FIG. 7 is a rear exploded perspective view of the fastener assembly of FIG. 1;

FIG. 8.1 is a side elevational view of a fastener assembly with a tie-down member in an inserted position;

FIG. 8.1A is a sectional view of the fastener assembly of FIG. 8.1 with the tie-down member in the inserted position;

FIG. 8.2 is a side elevational view of the fastener assembly of FIG. 8.1 with the tie-down member in a rotated position;

FIG. 8.2A is a sectional view of the fastener assembly of FIG. 8.1 with the tie-down member in the rotated position;

FIG. 8.3 is a side elevational view of the fastener assembly of FIG. 8.1 with the tie-down member in a stored position;

FIG. 8.3A is a sectional view of the fastener assembly of FIG. 8.1 with the tie-down member in the stored position;

FIG. 9 is an enlarged sectional view of a portion of the tie-down member of FIG. 8.1 and a socket for receiving the tie-down member;

FIG. 10.1 is a sectional view similar to FIG. 9 with the tie-down member located in the socket;

FIG. 10.2 is a side elevational view of the socket and tie-down member located in the socket;

FIG. 11.1 is a front perspective view of the fastener assembly according to a preferred embodiment of the invention;

FIG. 11.2 is a rear perspective view of the fastener assembly of FIG. 11.1;

FIG. 12.1 is a rear perspective cut-away view of the fastener assembly of FIG. 11.1;

FIG. 12.2 is an enlarged rear perspective view of the cut-away portion of the fastener assembly of FIG. 12.1;

FIG. 13.1 is a rear perspective view of a pickup truck bed with an installed bed liner prior to securing the bed liner to the truck bed;

FIG. 13.2 is an enlarged perspective sectional view of a portion of the truck bed and liner of FIG. 13.1 showing a marking stage of a method of installing the liner in accordance with the present invention;

FIG. 14.1 is a rear perspective view of the pickup truck bed with the bed liner removed and showing installation markings.

FIG. 14.2 is an enlarged perspective sectional view of a portion of the truck bed of FIG. 14.1 and showing initial installation of the retainer plate in accordance with the present invention;

FIG. 17.1 is a rear perspective view of the pickup truck bed with the bed liner installed using the fastener assembly according to the present invention.

FIG. 17.2 is an enlarged perspective sectional view of a portion of the truck bed, liner and fastener assembly of FIG. 17.1; and FIG. 18 is an enlarged perspective sectional view of a portion of the truck bed, liner and fastener assembly with the tie-down member of the fastener assembly in a rotated position for use.

DETAILED DESCRIPTION OF THE INVENTION

Figure 1:
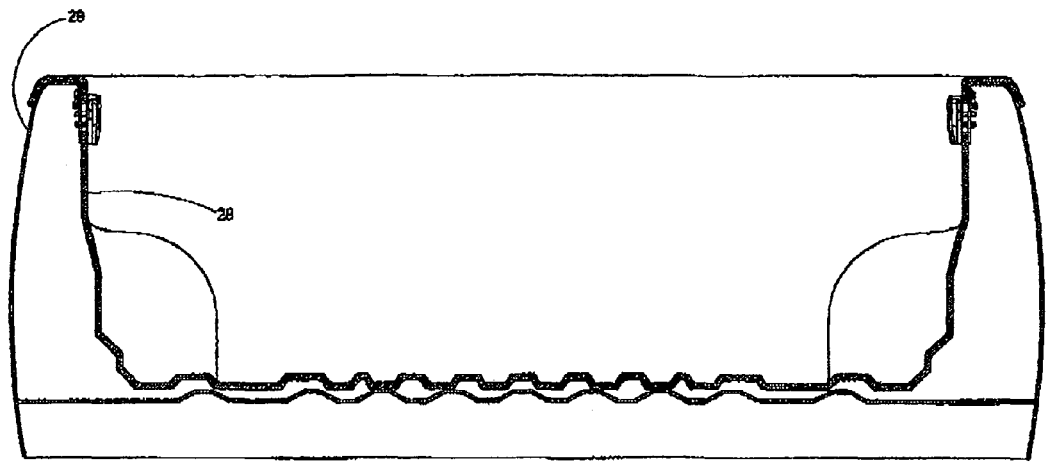
FIG. 1 is a rear sectional elevation of a truck bed with a bed liner installed using the fastener assembly in accordance with a preferred embodiment of the present invention taken along line 1—1 of FIG. 17.1.
Figure 2:
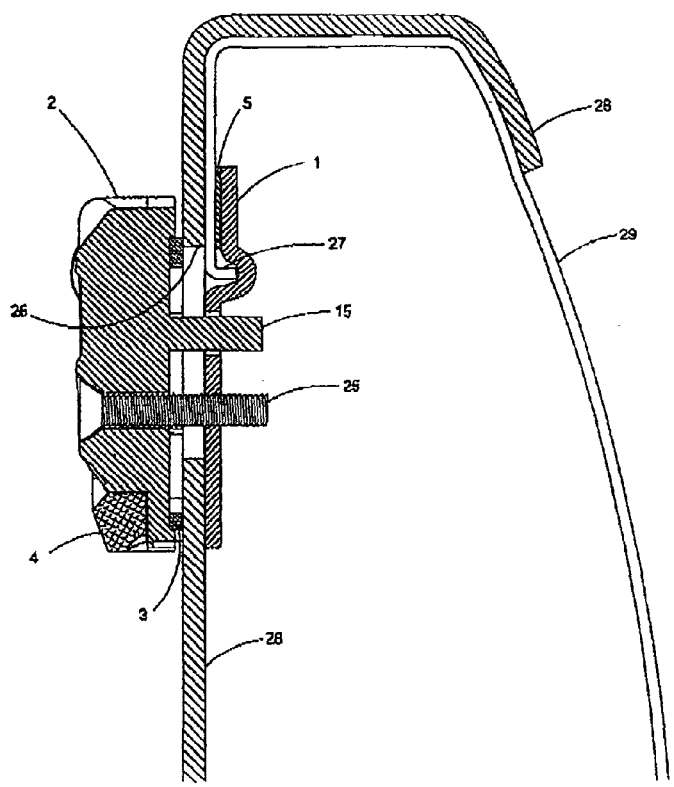
FIG. 2 is an enlarged sectional view of the pickup truck bed and attached bed liner of FIG. 1.

FIG. 17.1 shows a perspective view of a preferred embodiment of the present invention securing a bed liner 28 to a pickup truck cargo bed. As shown in FIG. 17.1, a plurality of fastener assemblies 100 secure bed liner 28 to cargo bed rail 29. Front and rear perspective views of a fastener assembly 100 are shown in FIGS. 11.1 and 11.2. FIG. 17.2 is an enlarged perspective view of one fastener assembly 100 with the tie-down member 4 in the down position. FIG. 1 shows a cross-sectional view of the pickup truck cargo bed showing the fastener assembly 100 securing the bed liner 28 to the cargo bed rail 29. As shown in FIG. 2, the fastener assembly 100 comprises a retaining plate 1 and a base member 2. FIG. 4.2 shows the base member 2 and retaining plate 1 in perspective view.

As shown in more detail in FIGS. 5.1 and 5.2, the retaining plate 1 includes a trough 8. The inside surfaces 9 and 10 of the trough 8 engage a lip 27 of the cargo bed rail, as shown in FIGS. 2 and 3. Adhesive 5 allows the installer to temporarily mount the retaining plate 1 to the inside surface of the cargo bed rail 29 during installation. FIG. 4.2 shows the surfaces 31 and 32 of the retaining plate 1 that engage the inner surface of the bed rail 29 and the outer (i.e., facing the cargo bed) surface of the bed liner, respectively. Hole 6 in the retainer plate 1 engages alignment pin 15 of the fastener assembly 100 while threaded hole 7 in the retaining plate 1 engages screw 25, as shown in FIG. 2. Alignment pin 15 keeps the base member 2 properly aligned with the retaining plate 1, while screw 25 secures the base member 2 and retaining plate 1 to the lip 27 of the cargo bed rail 29 and bed liner 28 by providing a compressive or clamping force. Alignment pin 15 and screw 25 fit through the hole 26 in the bed liner 28.

FIGS. 6 and 7 are exploded perspective views of the base member 2, tie-down member 4, and a mounting pad 3. The pad 3 is preferably made of rubber or some other elastomeric material, and its primary purpose is to provide an interface or cushion between the bed liner 28 and the base member 2 so that the compressive force applied by the screw 25 as it engages the threaded hole 7 in the retaining plate 1 does not damage the bed liner 28. A hole 20 in the pad 3 allows the screw 25 and the alignment pin 15 to the engage holes 6 and 7 in the retaining plate 1. Protrusions 19 extending from pad 3 engage corresponding holes 16 in the base member 2 to align the pad 3 with the base member 2. Protrusions 18 extending from pad 3 engage pockets 24 in the tie-down member 4 when the tie-down member 4 is in the folded-down position as shown in FIG. 4.2. Protrusions 18 keep the tie-down member 4 from vibrating when the tie-down member 4 is in the folded-down position. Finally, U-shaped members 17 of the pad 3 fit within sockets 14 in the base member 2 and engage axle ends 21 of the tie-down member 4, as explained below.

FIGS. 7 and 8.1–8.3A show how the tie-down member 4 engages the pad 3 and base member 2. The tie-down member 4 attaches to base member 2 by two axles, each of which has three parts. The inner portion 23 is generally circular in shape, but has cutouts along the top and bottom that allow the inner axle portion 23 to fit through opening 13 to socket 12 in base member 2. As shown in FIGS. 9 and 10.1, dimension b at the bottom of inner axle portion 23 is longer than dimension a. Socket 12 has a similar shape, with opening 13 having a dimension d that is slightly larger than the height c of inner axle portion 23. As shown in FIGS. 8.1 through 8.3A and FIGS. 10.1 and 10.2, and as discussed below, the shape of inner axle portion 23 and the socket 12 allows the user to install the tie-down member 4 through the outer, or cargo bed side of the base member 2, as shown initially in FIG. 8.1. FIG. 10.2 shows how the axle centerline 33 aligns with the socket centerline 34 during installation. As shown in FIG. 8.2, when the tie-down member 4 is rotated 180 degrees after installation to its in-use position, inner axle portion 23 cannot be pulled out of the socket 12. Finally, FIG. 8.3 and 8.3A shows the tie-down member 4 in its stowed position, where it is kept when it is not in use.

Collars 22 on the tie-down member 4 engage sockets 14 in the base member 2, as shown in FIG. 7. The collars 22 act against the sides of sockets 14 to bear any loads that are lateral to the base member 2. Loads that are lateral to the base member 2 are loads that are parallel to the front-rear axis of the cargo bed.

Finally, axle ends 21 are circular in shape and engage the U-shaped protrusions 17 on the rubber pad 3. The axle ends 21 help the keep rubber pad 3 from being pulled out of the base member 2. FIGS. 12.1 and 12.2 show cut-away views of the tie-down member 4, base member 2, and rubber pad 3 in an assembled condition.

Figure 15:
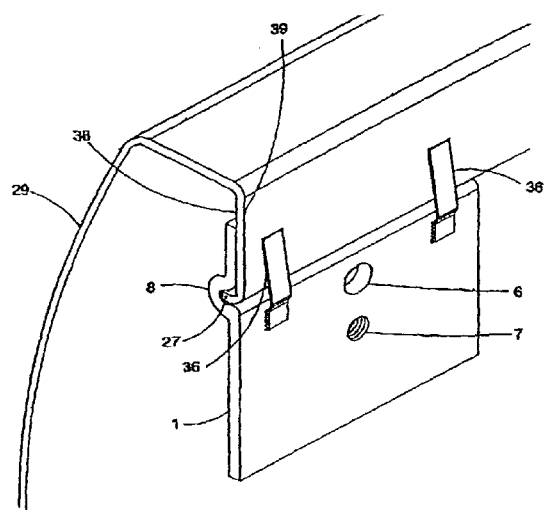
FIG. 15 is an enlarged perspective sectional view similar to FIG. 14.2 showing initial installation of the retainer plate in accordance with a further embodiment of the present invention.

The present invention is installed on a cargo bed to retain a cargo bed liner as follows: First, the cargo bed liner 28 is placed in the cargo bed 29 as shown in FIGS. 13.1 and 13.2. As shown in FIG. 13.2, the top part of the holes 26 in the bed liner 28 overlap the lower portion 40 of the inner, vertical portion of the cargo bed rail 29. Where a portion 40 of the cargo bed rail 29 is visible through the bed liner hole 26, the installer places a small vertical mark 35 on portion 40 downwardly from the center top of circle 26. Next, the installer removes the bed liner 28. The installer then places a retaining plate 1 on the inside surface of the cargo bed 29 using tape or adhesive 5 so that the trough 8 engages the lip 27 and the vertical mark 35 is aligned with the center of hole 6, as shown in FIGS. 14.1 and 14.2. FIG. 15 depicts an alternative means of attaching the retaining plate 1 to the cargo bed rail 29 but does not involve the use of tape or adhesive 5. Specifically, clips 36 engage the outer surface 39 of the cargo bed rail 29 in a friction engagement, holding the retaining plate 1 in place against the inner surface 38 while the bed liner 28 and base member 2 are put in place and secured.

Next, the bed liner 28 is replaced in the cargo bed 29.

Figure 16:
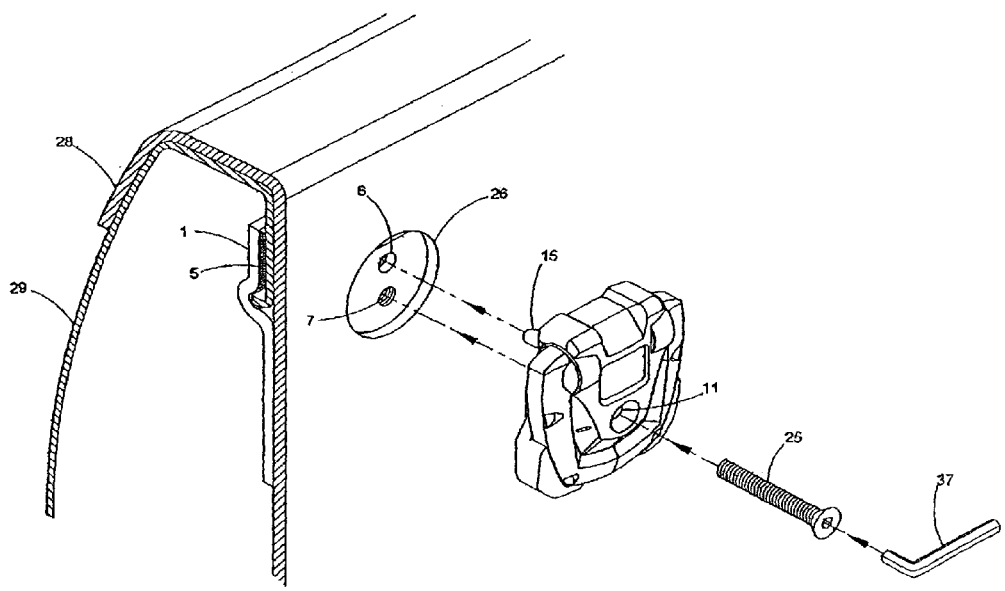
FIG. 16 is an enlarged exploded perspective sectional view of a portion of the truck bed and installed liner with the fastener assembly aligned for installation.

Once the retaining plate 1 is in place and the bed liner 28 is replaced in the cargo bed 29, the tie-down member 4 and pad 3 are installed on base member 2 as shown in FIGS. 6 through 8.3A. Pad 3 is installed on the base member 2 by fitting the U-shaped protrusions 17 within sockets 14, while protrusions 19 are fitted within sockets 16. Then, the axles of the tie-down member 4 are slipped into sockets 12 from the bed liner side of the base member 2, and then the tie-down member 4 is rotated 270° as shown in FIGS. 8.1–8.3A. Thus, when the base member 2 is installed on the cargo bed rail 29, the rubber pad 3 is attached to the base member 2, and the tie-down member 4 is in its down position. Once the pad 3 and tie-down member 4 are assembled with the base member 2, the entire fastener assembly 100 engages the retaining plate 1 as shown in FIG. 16. The alignment pin 15 passes through hole 26 in bed liner 28 and engages hole 6 in the retaining plate 1. Likewise, the screw 25 passes through hole 11 in the base member 2, through hole 26 in bed liner 28 and engages the threaded hole 7 in the retaining plate 1. Using allen wrench 37, the screw 25 is tightened until the base member 2 is securely attached to the retaining plate 1, thereby securing the bed liner 28 in place within the cargo bed 29.

When it is desired to use the tie-down member 4 to secure cargo within the cargo bed, the tie-down member 4 is rotated up 90° as shown in FIG. 18. When not in use, the tie-down member 4 is kept in its down position as shown in FIGS. 17.1 and 17.2.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A fastener assembly for retaining a bed liner in a cargo bed, the cargo bed having a bed rail, a lip extending from a terminal end of the bed rail in a direction away from the bed liner in an assembled condition and the bed liner having at least one hole, the fastener assembly comprising;
   a retaining plate for engaging the bed rail, the retaining plate comprising a one-piece plate including an upper portion, a trough and a lower portion, the upper and lower portions lying on parallel planes, the retaining plate having a length measured in a direction parallel to a length of the bed rail, a width of the upper portion being less than a width of the bed rail, the trough being located between the upper portion and the lower portion, the trough being formed along the entire length of the retaining plate, the trough having an inside surface for engaging the lip on the bed rail;
   a base member that engages the lower portion of the retaining plate through the bed liner hole;
   a tie-down member that engages the base member;
   means for attaching the upper portion of the retaining plate to the bed rail prior to securing the base member to the retaining plate, the means for attaching causing the upper portion of the retaining plate to attach with an inside surface of the bed rail such that the retaining plate is positioned on one side of a plane defined by an outside surface of the bed rail; and
   means for securing the base member to the lower portion of the retaining plate, the means for securing causing the upper portion of the retaining plate to compress against an upper portion of the base member while the bed rail and the bed liner are located therebetween and causing the lower portion of the retaining plate to compress against a lower portion of the base member while the bed liner wall is located therebetween resulting in the bed liner being secured to the cargo bed.

2. The fastener assembly of claim 1 wherein the base member further comprises a threaded connector that engages a corresponding threaded hole in the retaining plate to create a clamping force.

3. The fastener assembly of claim 1 wherein the base member further comprises an aligning pin that engages a corresponding aligning hole in the retaining plate.

4. The fastener assembly of claim 1 wherein the tie-down member is rotatably connected to the base member.

5. The fastener assembly of claim 1 wherein the base member includes at least one socket and an opening; and
the tie-down member includes a connecting portion comprising at least one inner portion, a collar and an axle end, the connecting portion cooperating wit the at least one socket and the opening to rotatably connect the tie-down member to the base member in the assembled condition.

6. The fastener assembly of claim 5 wherein the inner portion has a generally circular cross section with a first edge and a second edge opposite the first edge, the first and second edges being generally parallel, the first edge having a dimension that is shorter than a dimension of the second edge, the opening including an upper edge and a lower edge, the upper and lower edges being generally parallel.

7. The fastener assembly of claim 6 wherein the connecting portion is insertable and removable from the opening when the first and second edges are in planar alignment with the upper and lower edges and the first edge is positioned adjacent the upper edge, the connecting portion being blocked from insertion into the opening when the first and second edges are in planar alignment with the upper and lower edges and the first edge is positioned adjacent the lower edge.

8. The fastener assembly of claim 1 wherein the means for attaching is comprised of an adhesive that temporarily secures the retaining plate to a surface of the bed rail.

9. The fastener assembly of claim 1 further comprising an elastomeric pad between the base member and the bed liner.

10. The fastener assembly of claim 1 further comprising flexible clips that secure the retaining plate to the bed rail.

11. A fastener assembly for retaining a bed liner in a cargo bed, the cargo bed having a bed rail, a lip extending from a terminal end of the bed rail in a direction toward a bed wall and the bed liner having at least one hole, the fastener assembly comprising:
a retaining plate that engages the lip on the bed rail, the retaining plate being comprised of a one-piece plate having an upper portion, a trough and a lower portion, the upper and lower portions lying on parallel planes, the retaining plate having a length measured in a direction parallel to a length of the bed rail, a width of the upper portion being less than a width of the bed rail, the trough being located between the upper portion and the lower portion, the tough being formed along the entire length of the retaining plate, the tough having an inside surface for engaging the lip on the bed rail;
a base member that engages the lower portion of the retaining plate through the hole in the bed liner;
a tie-down member that is rotatably attached to the base member, the tie-down member being movable between an in-use position and an out-of-use position;
means for attaching the upper portion of the retaining plate to the bed rail prior to securing the base member to the retaining plate, the means for attaching causing the upper portion of the retaining plate to attach to an inside surface of the bed rail such tat the retaining plate is positioned on one side of a plane defined by an outside surface of the bed rail; and
means for securing the base member to the lower portion of the retaining plate, the means for securing causing the upper portion of the retaining plate to compress against an upper portion of the base member while the bed rail and the bed liner are located therebetween and causing the lower portion of the retaining plate to compress against a lower portion of the base member while the bed liner is located therebetween resulting in the bed liner being secured to the cargo bed.

12. The fastener assembly of claim 11 wherein the means for securing includes a threaded member on the base member tat engages a corresponding threaded hole in the retaining plate.

13. The fastener assembly of claim 11 further comprising an elastomeric pad between the base member and the bed liner.

14. The fastener assembly claim 13 wherein the elastomeric pad further comprises at least one flexible member that engages the tie-down member to keep the tie-down member in the out-of-use position.

15. The fastener assembly of claim 11 wherein the base member further comprises an aligning pin that engages a corresponding aligning hole in the retaining plate.

* * * * *